US010576424B2

(12) United States Patent
Gao et al.

(10) Patent No.: US 10,576,424 B2
(45) Date of Patent: Mar. 3, 2020

(54) ION EXCHANGE POLYMERS AND A METHOD FOR MAKING ION EXCHANGE POLYMERS

(71) Applicant: BL TECHNOLOGIES, INC., Minnetonka, MN (US)

(72) Inventors: Yan Gao, Quebec (CA); Russell James MacDonald, Westborough, MA (US); Kai Zhang, Singapore (SG); Yonghong Zhao, Singapore (SG)

(73) Assignee: BL TECHNOLOGIES, INC., Minnetonka, MN (US)

( * ) Notice: Subject to any disclaimer, the term of this patent is extended or adjusted under 35 U.S.C. 154(b) by 1022 days.

(21) Appl. No.: 15/022,751

(22) PCT Filed: Sep. 17, 2013

(86) PCT No.: PCT/US2013/060140
§ 371 (c)(1),
(2) Date: Mar. 17, 2016

(87) PCT Pub. No.: WO2015/041629
PCT Pub. Date: Mar. 26, 2015

(65) Prior Publication Data
US 2016/0228867 A1 Aug. 11, 2016

(51) Int. Cl.
*B01D 61/44* (2006.01)
*C08J 5/22* (2006.01)
*B01J 47/12* (2017.01)
*B01J 41/13* (2017.01)

(52) U.S. Cl.
CPC ............. *B01D 61/44* (2013.01); *B01J 41/13* (2017.01); *B01J 47/12* (2013.01); *C08J 5/2231* (2013.01); *C08J 2339/00* (2013.01)

(58) Field of Classification Search
CPC ..... B01D 61/44; C08J 5/2231; C08J 2339/00; B01J 47/12; B01J 41/13
USPC ........................................ 521/27
See application file for complete search history.

(56) References Cited

U.S. PATENT DOCUMENTS

| 4,617,321 A | 10/1986 | MacDonald |
| 5,989,392 A | 11/1999 | Tang et al. |
| 7,968,663 B2 | 6/2011 | MacDonald et al. |
| 8,138,291 B2 | 3/2012 | MacDonald et al. |
| 2006/0084772 A1 | 4/2006 | Wong Shing et al. |
| 2011/0281197 A1 | 11/2011 | Daikoku et al. |

FOREIGN PATENT DOCUMENTS

| CN | 1269854 A | 10/2000 | |
| CN | 101076633 A | 11/2007 | |
| CN | 102515574 A | 6/2012 | |
| CN | 102776802 A | * 11/2012 | |
| CN | 102776802 A | 11/2012 | |
| WO | 2005/102503 A1 | 11/2005 | |
| WO | 2005115618 A1 | 12/2005 | |
| WO | WO-2005115618 A1 * | 12/2005 | ........ B01J 20/28085 |
| WO | 2010/110333 A1 | 9/2010 | |
| WO | 2013052227 A1 | 4/2013 | |
| WO | WO-2013052227 A1 * | 4/2013 | ............ C08J 5/2331 |

OTHER PUBLICATIONS

Unofficial English Translation of Chinese Office Action issued in connection with corresponding CN Application No. 201380079659.4 dated Dec. 16, 2016.
Japanese Search Report issued in connection with corresponding JP Application No. 2016-541944 dated May 29, 2017.
Notification of Reasons for Refusal issued in connection with corresponding JP Application No. 2016-541944 dated Jun. 20, 2017.
International Search Report and Written Opinion issued in connection with corresponding international application PCT/US2013/060140 dated Apr. 23, 2014.
Chun et. al. "Cymotry and Velocimetry on a Microfluidic Chip Using Polyelectrolytic Salt Bridges" Analytival Chemistry, vol. 77, No. 8, Mar. 2, 2005, pp. 2490-2495, XP055008068, ISSN: 0003-2700, DOI 10.1021/ac048535o Section: "PSBE Fabrication"; p. 2492, right hand column.
Canadian Patent Application No. 2,923,167, Office Action dated Jun. 17, 2019.

* cited by examiner

*Primary Examiner* — Michael Bernshteyn

(57) ABSTRACT

An ion exchange polymer is provided. The ion exchange polymer is a reaction product of a reaction between a crosslinker monomer and a cationic monomer. The crosslinker monomer is a reaction product of a reaction between a first crosslinking monomer and a second crosslinking monomer. Further, the cationic monomer comprises a quaternary ammonium group. A method for making an ion exchange polymer is also provided. The method comprises a step of preparing a curable solution and a step of curing the curable solution. The step of preparing the curable solution comprises mixing a pair of crosslinking monomers, a cationic monomer that comprises a quaternary ammonium group and an acid. A membrane is also provided. The membrane comprises the ion exchange polymer made by the method provided.

9 Claims, No Drawings

ION EXCHANGE POLYMERS AND A METHOD FOR MAKING ION EXCHANGE POLYMERS

BACKGROUND

The present disclosure relates to ion exchange polymers.

U.S. Pat. No. 4,617,321 to MacDonald, which is incorporated herein by reference, disclosed a process for manufacturing cation exchange membranes by polymerizing a curable solution of monomers in an aqueous solvent system. The curable solution of monomers includes an aliphatic sulfonic acid monomer and two crosslinking monomers. The two crosslinking monomers form a crosslinking unit at the same time as the polymerization reaction. The polymerization reaction also included a free radical generating catalyst.

SUMMARY OF THE INVENTION

An anion exchange polymer composition is described below. The anion exchange polymer composition comprises a reaction product of a reaction between a crosslinker monomer and a cationic monomer. The crosslinker monomer is a first reaction product of a first reaction between a first crosslinking monomer and a second crosslinking monomer. The cationic monomer comprises a quaternary ammonium group.

A method for making an anion exchange polymer is also described below. The method comprises a step of preparing a curable solution and a step of curing the curable solution. The step of preparing the curable solution comprises the steps of mixing the chemical components and using water as a solvent. The chemical components comprise a first crosslinking monomer, a second crosslinking monomer, a cationic monomer that comprises a quaternary ammonium group, and an acid. The first crosslinking monomer has the following formula:

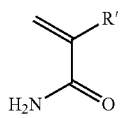

wherein R'=H or $CH_3$. The second crosslinking monomer has the following formula:

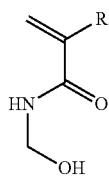

wherein R=H or $CH_3$.

An ion exchange membrane is also described below. The ion exchange membrane comprises an anion exchange polymer that comprises a plurality of structural units that have a structure that is represented by the following formula:

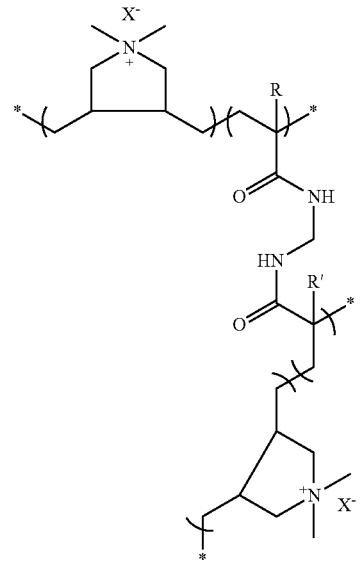

wherein R, R'=H or $CH_3$ and $X^-=Cl^-$ or $SO_4^{2-}$.

When diallyldimethylamine chloride polymerizes, it can form a cyclic, 5-member ring structure. Without being bound by theory, ion exchange polymers and ion exchange membranes that comprise this 5-member ring structure may have increased tolerance to caustic and acid. Caustic and acid are typically used in the maintenance of ion exchange polymers and ion exchange membranes. Further, ion exchange polymers and ion exchange membranes that comprise this 5-member ring structure may also have a lower fouling potential when used in electrodialysis and bipolar electrodialysis processes.

DETAILED DESCRIPTION

An anion exchange polymer composition comprises a reaction product of a reaction between a crosslinker monomer and a cationic monomer. The crosslinker monomer is a first reaction product of a first reaction between a first crosslinking monomer and a second crosslinking monomer. The cationic monomer comprises at least one quaternary ammonium group.

The first crosslinking monomer has the following formula:

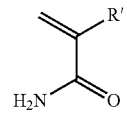

(1)

wherein R'=H or $CH_3$.

For example, the first crosslinking monomer can be either acrylamide (AA) or methacrylamide (MAA), with MAA being more particular.

The second crosslinking monomer has the following formula:

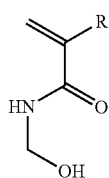
(2)

wherein R=H or CH$_3$.

For example, the second crosslinking monomer can be either N-(hydroxymethyl)acrylamide (NHMA) or N-(hydroxymethyl)methacrylamide (NMMAA).

The first crosslinking monomer reacts with the second crosslinking monomer to form the crosslinker monomer. This reaction can occur at room temperature and in the presence of an acid according to the following equation:

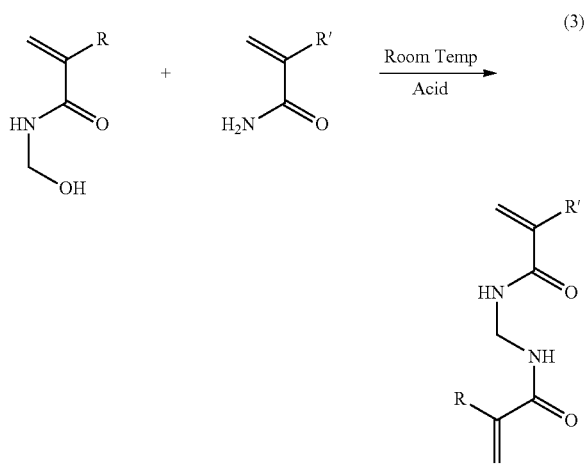
(3)

wherein R and R'=H or CH$_3$.

In one example of the anion exchange polymer composition, the cationic monomer is diallyldimethylamine chloride (DADMACl). During a polymerization reaction, DADMACl can form a backbone of cyclic quaternary ammonium salts, as shown in the equation below:

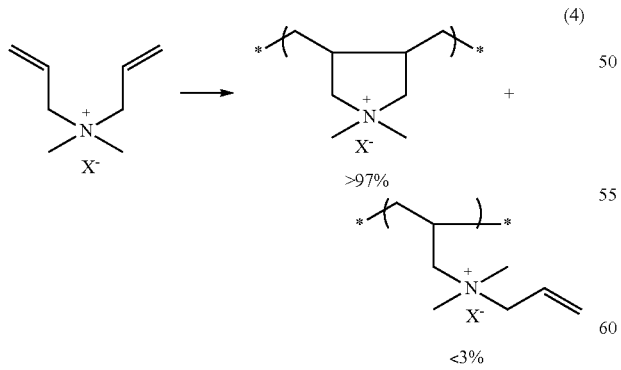
(4)

wherein X$^-$=Cl$^-$ or SO$_4^{2-}$.

In one example of the anion exchange polymer composition, the polymer comprises multiple structural units with a structure represented by the following formula:

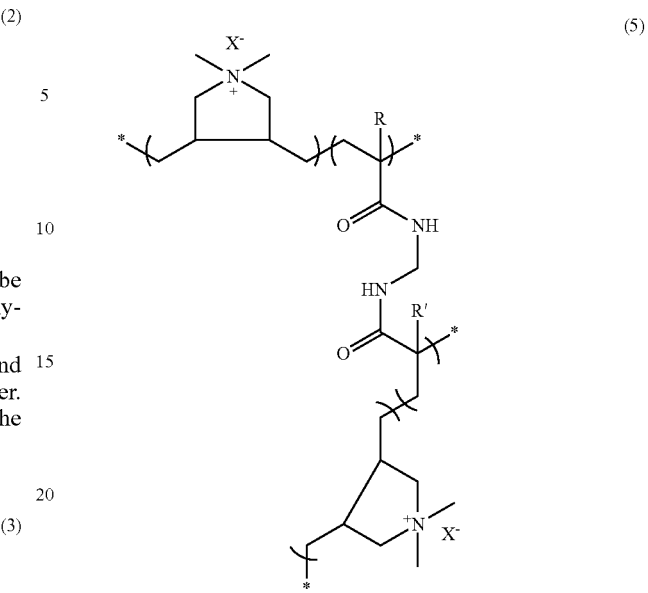
(5)

wherein R, R'=H or CH$_3$ and X$^-$=Cl$^-$ or SO$_4^{2-}$.

A method for making an anion exchange polymer comprises a step of preparing a curable solution and a step of curing the curable solution.

The step of preparing the curable solution comprises a step of mixing the chemical components using water as a solvent. The chemical components include, but are not limited to, the first crosslinking monomer, the second crosslinking monomer, a cationic monomer that comprises a quaternary ammonium group, and an acid. During the step of preparing the curable solution, the first crosslinking monomer can be either AA or MAA, with MAA being more particular, and the second crosslinking monomer can be either NHMA or NMMAA. The first and second crosslinking monomers undergo a condensation reaction to form the crosslinker monomer. In one example, the cationic monomer is DADMACl and the curable solution comprises DADMACl and the crosslinker monomer is according to the equation described by the formula below:

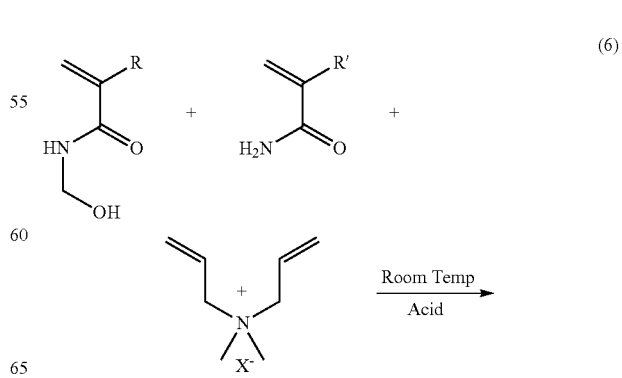
(6)

-continued

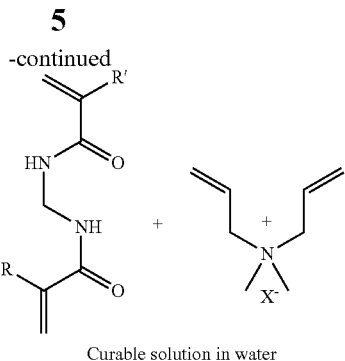

Curable solution in water wherein R, R'=H or $CH_3$ and $X^-=Cl^-$ or $SO_4^{2-}$.

The condensation reaction can proceed at room temperature and in the presence of an acid. The acid may be any type of water soluble acid, such as a mineral acid. For example, the acid can be, but is not limited to, hydrochloric acid, methane sulfonic acid, sulfuric acid or phosphoric acid. In an embodiment, the acid is either methane sulfonic acid or sulfuric acid.

In one option, the molar ratio of the quaternary ammonium salts to the crosslinker monomer can be varied to provide different ion exchange capacities and different water contents of the resulting anion exchange polymer membranes. For example, the molar ratio of quaternary ammonium salts to the crosslinker monomer can fall within a range of about 0.5:1 to about 2.0:1.

The step of preparing the curable solution can use water as a solvent in any amount suitable for solubilizing some or all of the chemical components. For example, the water can be used in a range from about 10 percent to about 90 percent by weight, based on the total weight of the reaction mixture. In other examples, the amount of water used can be in a range from about 20 percent to about 70 percent by weight, based on the total weight of the reaction mixture, or in a range from about 25 percent to about 50 percent by weight, based on the total weight of the reaction mixture.

During the curing step, the DADMACl and the crosslinker monomer undergo a copolymerization reaction and a crosslinking reaction to form the anion exchange polymer composition with multiple structural units with a structure represented by the Formula (5).

In one example of the curing step, the curable solution cures upon heating. Suitable temperatures for the curing step are within a temperature range from about 40° C. to about 150° C., or within a temperature range from about 60° C. to about 110° C., or within a temperature range from about 75° C. to about 100° C.

In another example of the curing step, the curable solution cures photochemically with the addition of a photoinitiator. Non-limiting examples of photoinitiators include benzophenone, benzyl, antraquinone, eosin or methylene blue.

The curing step can occur within a reaction-time range from about 1 minute to about 2 hours, or within in a reaction-time range from about 10 minutes to about 1.5 hours, or within a reaction-time range from about 30 minutes to about 1.5 hours, or more.

A catalyst can be added to the curable solution when it is already prepared. Optionally, the catalyst can be added before, or during, the step of preparing the curable solution. The catalyst aids in the curing step. The catalyst may be spontaneously activated or activated by the addition of heat, electromagnetic radiation, electron beam radiation or by chemical promoters. The catalyst may be added in any amount suitable for aiding in curing. For example, suitable amounts of the catalyst may be in the following ranges: from about 0.1 percent to about 5.0 percent by weight, based upon the weight of the reaction mixture; from about 0.5 percent to about 3.0 percent by weight, based upon the weight of the reaction mixture; and from about 0.5 by weight to about 1.0 percent by weight, based upon the weight of the reaction mixture.

The catalyst can be a free-radical generating polymerization initiator or a photoinitiator, or both. For example, the catalyst may be a peroxide or a water soluble azo-initiator. The peroxide catalysts include, but are not limited to, methyl ethyl ketone peroxide and dibenzoyl peroxide. The azo-initiator catalysts include, but are not limited to, 2,2'-azobis[2-(2-imidazolin-2-yl)propane]dihydrochloride, 2,2'-azobis(N,N'-dimethylene isobutyramidine)dihydrochloride, 2,2'-azobis(2-methylpropionamidine)dihydrochloride, 2,2'-azobis[N-(2-carboxyethyl)-2-methylpropionamidine] hydrate, 2,2'-azobis{2-[1-(2-hydroxyethyl)-2-imidazolin-2-yl)propane], 2,2'-azobis[2-methyl-N-(2-hydroxyethyl) propionamide] and dimethyl 2,2'-azobis(2-methylpropionate).

The anion exchange polymer composition described above can be used to prepare an ion exchange membrane. The ion exchange membrane comprises an ion exchange polymer composition that is a reaction product of one or more reactions between a cationic monomer, a first crosslinking monomer and a second crosslinking monomer. The cationic monomer comprises at least one quaternary ammonium group. For example, the ion exchange polymer composition comprises a plurality of structural units with the structure represented by Formula (5).

In one example of the ion exchange membrane, the curable solution is applied to a base membrane or a support membrane to provide ionic functionality to the membrane. This application step is followed by a curing step. In another example, the ion exchange membrane is formed by reinforcing a support fabric with the curable solution, followed by a curing step. In another example, the curable solution can be cast onto the fabric or soaked into the fabric using individual pieces of fabric, multiple pieces of fabric arranged in one or more stacks or with fabric from a roll in a continuous process. The curable solution is then cured. Optionally, the curing step occurs as a separate continuous step during the continuous process.

The base membrane or the support membrane may have any thickness suitable for preparing the membrane. For example, the ion exchange membrane, the base membrane, or the support membrane, has a thickness within a range from about 1 mil to about 75 mils, or the thickness is within a range from about 1 mil to about 50 mils, or the thickness is within a range from about 1 mil to about 20 mils, or the thickness is within a range from about 1 mil to about 10 mils.

The ion exchange membrane can also be formed by imbibing a porous plastic film, such as polyethylene, polypropylene or Teflon®, with the curable solution. For example, the curable solution can be applied to the porous plastic film by casting the curable solution onto the porous plastic film or by soaking the porous plastic film in the curable solution. The porous plastic film and the curable solution can then be cured.

In another example of the ion exchange membrane, the curable solution can be cured into a solid mass of the ion exchange polymer. The solid mass can then be processed and pulverized into small particles. The small particles can then be blended in an extruder and heated with a melted plastic, such as polyethylene or polypropylene. The plastic and ion exchange polymer mixture can then be extruded into sheets of ion exchange membranes.

The ion exchange membrane can absorb water. The amount of absorbed water is referred to as the water content. For example, the ion exchange membrane can have a water content within a range from about 25% to about 60%, or within a range from about 40% to about 58%; or within a range from about 42% to about 48%.

The ion exchange membrane has an ion exchange capacity (IEC) that, for example, falls within a range from about 1.0 meq/g to about 2.6 meq/g, or within a range from about 1.2 meq/g to about 2.4 meq/g, or within a range from about 1.5 meq/g to about 2.2 meq/g, or within a range from about 1.8 meq/g to about 2.2 meq/g. The IEC may also be presented in the units of meq/dry gram (dg).

Examples

A first example curable solution (Example 1) was prepared by mixing 52.53 g of a 65% solution of diallyldimethylammonium chloride (DADMACl), 19.14 g of N-(hydroxymethyl)acrylamide (NHMA), 16.13 g of Methacrylamide (MAA), 4.55 g of a 96% solution of methanesulfonic acid (MeSO$_3$H) and 2.65 g of reverse osmosis permeate water (RO water).

The DADMACl solution and RO water were weighed in a 250 ml beaker. Next, the NHMA and MAA were added to the beaker. The solution was stirred for about 15 minutes using a magnetic stirrer. Next, the methanesulfonic acid was added to the above solution, while stirring continued. The temperature increased to about 33 to 38° C. The solution was further stirred for about 30 to 45 minutes, during which time the temperature returned to room temperature and all of the solids dissolved forming a homogenous solution.

One gram of the catalyst 2,2'-Azobis[2-(2-imidazolin-2-yl)propane]dihydrochloride, was dissolved in 5 g of RO water. The catalyst 2,2'-Azobis[2-(2-imidazolin-2-yl)propane]dihydrochloride is commercially available as VA-044. Next, the solution of 2,2'-Azobis[2-(2-imidazolin-2-yl)propane]dihydrochloride was added to the homogeneous solution and stirring continued for 10 to 15 minutes to produce the first example curable solution (Example 1).

The first example curable solution was then cured to produce an ion exchange membrane according to the following process.

A 6"×6" mylar sheet was placed on a 6"×6" glass plate and the first example curable solution was added to the mylar tray. An acrylic cloth was placed on the mylar sheet and the first example curable solution was spread across the acrylic cloth. More of the first example curable solution was added on to the acrylic cloth. A second mylar tray was placed on the acrylic cloth and any excess of the first example curable solution was then removed. Another glass plate was placed on top of the second mylar tray. Binder clips clamped the glass/mylar/acrylic cloth/mylar/glass to form a sandwich. The sandwich was heated for 60 minutes in an 85° C. oven. While in the oven, the first example curable solution cured into a crosslinked, solid polymer membrane. After the curing, the sandwich was removed and allowed to cool to room temperature. The sandwich was then disassembled and the polymer membrane was soaked in a bath of NaHCO$_3$.

Following the soak, the ion exchange capacity and the water content of the polymer membrane were characterized by the following example procedures.

Two 3"×0.75" strips were cut from the solid polymer membrane and placed in a 250 ml Erlenmeyer flask. 100 ml of a 1N sodium chloride solution was added to the flask and the flask was shaken for 30 minutes. The 1N sodium chloride solution was replaced with 100 ml of deionized (DI) water and the shaking continued for another 30 minutes. This wash step was repeated three times. Next the membrane strips were soaked in a 1N NaNO$_3$ solution and shaken for 30 minutes. Following which, the membrane strips were removed from the flask and rinsed with DI water. Any excess water on the surface of the membrane strips was blotted using adsorbent paper and the wet weight of the membrane strips was recorded (Wwet). The membrane strips were then dried for at least 30 minutes in a 120° C. oven. The membrane strips were then removed from the oven and the dry weight was recorded (Wdry).

To measure the concentration of chloride ions, the 1N NaNO$_3$ solution from the flask was titrated against a 0.1N AgNO$_3$ solution (in a burette) in the presence of a K$_2$CrO$_4$ indicator. The initial volume (Vi) and the final volume (Vf) of the 0.1N AgNO$_3$ solution were recorded.

The ion exchange capacity and water content of the membranes were then calculated according to the following equations:

$$\text{IEC (in meq/g)} = [(\text{Titration volume of 0.1N AgNO}_3) \times (\text{normality of AgNO}_3)/(W_{dry}-\text{cloth backing weight})] \times 1000$$

$$\text{Water content (\%)} = [(W_{wet}-W_{dry})/(W_{wet}-\text{cloth backing weight})] \times 100$$

The thickness and area-resistance of the solid polymer membrane were analyzed by the following example procedures. Another 3"×0.75" strip was cut from the solid polymer membrane and placed into a 100 ml plastic bottle. 80 mL of a 1N sodium chloride solution was added to the bottle and the bottle was shaken for 30 minutes. The solution was discarded and the membrane strip was washed three times in 80 ml of DI water. The membrane strips were then soaked in a 0.01N sodium chloride solution, inside the bottle, and the shaking continued for at least 30 minutes. The thickness of the membrane strip was then measured using a thickness gauge.

The electrical resistance was measured by placing the membrane strip between two platinum electrodes connected to a conductivity/resistivity meter. The recorded resistance was multiplied by the area of the electrodes to obtain the area-resistance.

The ion exchange membrane made from the first example curable solution had the following properties:
Ion Exchange Capacity=2.21 meq/d g
Water Content=46.9%
Membrane thickness=0.63 mm
Area-Resistance=13.9 Ohm-cm$^2$ Seven other example curable solutions (Examples 2 to 8) were prepared using the same example procedures as described for Example 1. Table 1, below, summarizes of the amount (grams) of the chemical components used to prepare all eight example curable solutions.

TABLE 1

Chemical components and amounts used to make example curable solutions.

| | DADMACl (65% solution) | NHMA | NMMAA (60% solution) | MAA | AA | Water | MeSO$_3$H | H$_2$SO$_4$ | VA-044 |
|---|---|---|---|---|---|---|---|---|---|
| 1 | 52.53 | 19.14 | 0 | 16.13 | 0 | 7.65 | 4.55 | 0 | 1 |
| 2 | 52.53 | 19.14 | 0 | 16.13 | 0 | 6.13 | 6.07 | 0 | 1 |
| 3 | 49.25 | 20.42 | 0 | 17.21 | 0 | 8.17 | 0 | 4.95 | 1 |
| 4 | 55.81 | 19.48 | 0 | 0 | 13.71 | 6.27 | 0 | 4.73 | 1 |
| 5 | 47.76 | 21.60 | 0 | 0 | 15.21 | 10.20 | 0 | 5.24 | 1 |
| 6 | 41.64 | 0 | 36.81 | 16.30 | 0 | 2.13 | 0 | 3.13 | 0.4 |
| 7 | 44.36 | 0 | 34.42 | 15.24 | 0 | 0.25 | 5.74 | 0 | 0.4 |
| 8 | 77.104 | 44.391 | 0 | 37.403 | 0 | 19.56 | 0 | 21.536 | 0.8 |

Examples 1, 2, 3, and 8 all include DADMACl, NHMA and MAA as part of the chemical components. Examples 4 and 5 both include DADMACl, NHMA and AA as part of the chemical components. Examples 6 and 7 both include DADMACl, NMMAA and MAA as part of the chemical components.

The example curable solutions (Examples 2 to 8) were cured to form ion exchange membranes, as described above for Example 1. The polymer membranes were analyzed for ion exchange capacity (meq/dg) and water content (%). The ion exchange membranes made from the first, second, third, fourth, fifth, and eighth example curable solutions were further analyzed for membrane thickness (mm) and area-resistance (Ohm-cm$^2$).

Table 2, below, summarizes the results of the analysis of the ion exchange membranes produced with all eight example curable solutions.

| Examples | Ion Exchange Capacity (meq/dg) | Water Content (%) | Membrane thickness (mm) | Area-Resistance (Ohm-cm$^2$) |
|---|---|---|---|---|
| 1, 2, 3 and 8 | 1.3 to 2.2 | 43.6 to 56 | 0.59 to 0.63 | 14 to 19 |
| 4 and 5 | 2.0 to 2.2 | 42 to 47 | 0.60 to 0.64 | 13 to 26 |
| 6 and 7 | 1.7 to 2.0 | 42 to 46 | N/A | N/A |

N/A indicates values not measured.

These examples provide a range of values for the ion exchange capacity (meq/dg), water content (%), the membrane thickness (mm) and the area-resistance (Ohm-cm$^2$). The inventors expect that other ranges will also provide useful ion exchange membranes. Other suitable ranges may be narrower or other suitable ranges may be broader, for example at least 50% broader.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art.

What is claimed is:

1. A method for making an anion exchange membrane comprising steps of:
   preparing an aqueous curable solution; applying the curable solution to a support membrane or fabric; and curing the curable solution,
   wherein preparing an aqueous curable solution comprises a step of mixing chemical components and water,
   wherein the chemical components comprise a first crosslinking monomer, a second crosslinking monomer, a diallyldialkylammonium salt, and an acid,
   wherein the first crosslinking monomer has the following formula:

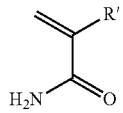

wherein R'=H or CH$_3$, and
   the second crosslinking monomer has the following formula:

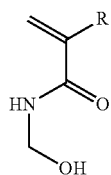

wherein R=H or CH$_3$.

2. The method of claim 1, wherein the preparing an aqueous curable solution occurs at room temperature.

3. The method of claim 1, wherein the curing the curable solution comprises a step of heating the curable solution.

4. The method of claim 1, where the preparing an aqueous curable solution further comprises a step of adding a catalyst.

5. The method of claim 1, further comprising a step of adding a catalyst after the preparing an aqueous curable solution and before the curing the curable solution.

6. The method of claim 1, wherein the diallyldialkylammonium salt is diallyldimethylammonium chloride.

7. The method of claim 2, wherein the curing the curable solution comprises a step of heating the curable solution.

8. The method of claim 2, wherein the preparing an aqueous curable solution further comprises a step of adding a catalyst.

9. The method of claim 3, wherein the preparing an aqueous curable solution further comprises a step of adding a catalyst.

* * * * *